United States Patent [19]

Kimura

[11] Patent Number: 5,572,077
[45] Date of Patent: Nov. 5, 1996

[54] MINIATURE MOTOR

[75] Inventor: Hiroshi Kimura, Chiba-ken, Japan

[73] Assignee: Mabuchi Motor Co., Ltd., Chiba-ken, Japan

[21] Appl. No.: 167,733

[22] Filed: Dec. 15, 1993

[30] Foreign Application Priority Data

Dec. 17, 1992 [JP] Japan ................. 4-086624 U

[51] Int. Cl.⁶ ........................................ H02K 11/00
[52] U.S. Cl. ........................................ 310/40 MM; 310/71
[58] Field of Search ................ 310/40 MM, 43, 310/68 R, 71, 89

[56] References Cited

U.S. PATENT DOCUMENTS

| | | | |
|---|---|---|---|
| 5,194,772 | 3/1993 | Matsushita | 310/71 |
| 5,270,599 | 12/1993 | Aoyagi et al. | 310/71 |
| 5,281,876 | 1/1994 | Sato | 310/40 MM |
| 5,287,028 | 2/1994 | Suzuki et al. | 310/71 |
| 5,343,102 | 8/1994 | Mabuchi et al. | 310/71 |
| 5,357,159 | 10/1994 | Hagiwara et al. | 310/40 MM |
| 5,363,005 | 11/1994 | Shibata et al. | 310/244 |
| 5,434,460 | 7/1995 | Mabuchi et al. | 310/71 |

*Primary Examiner*—Steven L. Stephan
*Assistant Examiner*—Michael Wallace, Jr.
*Attorney, Agent, or Firm*—McGlew and Tuttle

[57] ABSTRACT

A miniature motor including a case formed into a bottomed hollow tubular shape and having a permanent magnet on the inner circumferential surface thereof, a rotor consisting of an armature and a commutator, and a case cover fitted to an open end of the case, and having brushes making sliding contact with the commutator and input terminals electrically connected to the brushes, in which a ground terminal formed into a substantially W shape in planar projected profile, with a U-shaped engaging part provided at the central part thereof for engaging with the case cover, and pinching parts provided at both ends thereof, is interposed between a pair of the input terminals so that one pinching part of the ground terminal forces one of the input terminals in position, and the engaging part is interposed between the case and the case cover.

12 Claims, 4 Drawing Sheets

MINIATURE MOTOR

FIELD OF THE INVENTION

This invention relates to a miniature motor used for audio and video equipment, and automotive electric components, and more particularly to a miniature motor which can be easily assembled, has great resistance to vibration and impact, etc. and high reliability in electrical connection.

BACKGROUND OF THE INVENTION

FIG. 1 is a partially cross-sectional side view illustrating an example of a miniature motor to which this invention is applied. In FIG. 1, reference numeral 31 refers to a case made of a metallic material, such as mild steel, formed into a bottomed hollow tubular shape, and having a permanent magnet 32 of an arc-segment shape, for example, fixedly fitted to the inner circumferential surface thereof. Numeral 33 refers to a case cover made of a thermoplastic resin material and formed into such a shape that the case cover 33 can be fitted to an open end of the case 31. Numeral 34 refers to a rotor consisting of an armature 35 facing the permanent magnet 32, and a commutator 36 rotatably supported by bearings 37 and 38 each provided on the case 31 and the case cover 33.

Numeral 39 refers to brush arms of an electrically conductive material formed into a plate shape, having at the free ends thereof brushes 40 making sliding contact with the commutator 36, and provided inside the case cover 33. Inside the case cover 33 also provided are input terminals 41 electrically connected to the brush arms 39, through which power is fed from an external d-c power source to the armature 35 via the brush arms 39, the brushes 40 and the commutator 36.

In a miniature motor having the aforementioned construction, when current is fed to the armature 35, rotating force is imparted to the armature 35 disposed in a magnetic field generated by the permanent magnet 32 fixedly fitted to the inner circumferential surface of the case 31. Thus, the rotor 34 is caused to rotate, driving various pieces of equipment connected to the rotor 34.

Such a miniature motor often employs a means for reducing electrical noise in which one of the input terminals 41 is connected to the case 31 via a ground terminal 42 made of an electrically conductive material and formed into a flat plate shape, as shown in FIG. 2. There also is another type of electrical-noise reducing means in which a capacitor 44 is connected across a pair of the input terminals 41 via lead wires 43, as shown in FIG. 3.

In the constructions shown in FIGS. 2 and 3 above, an additional space must be provided inside the equipment or apparatus powered by the miniature motor since the component members of the aforementioned means for reducing electrical noise, such as the ground terminal 42 or the capacitor 44, is installed outside the miniature motor. Furthermore, a mounting space more than necessary has to be provided in the equipment or apparatus because the shape, dimensions and mounting position of the component members of the aforementioned means for reducing electrical noise are not known beforehand by the manufacturer of the equipment or apparatus.

In addition, since the aforementioned means for reducing electrical noise has no common component members, if different types of components are required, separate jigs, tools and operators have to be used. This leads to lowered production efficiency.

The construction shown in FIG. 3 requires the troublesome work of connecting the lead wires 43 of the capacitor 44 to the input terminals 41. That is, soldering work necessary for connecting these components, wiring and cutting operations of the lead wires 43 require a certain degree of skills because the capacitor 44 has to be mounted in an extremely limited space. This results in increased time and manhours, leading to high manufacturing cost. Moreover, soldering in a confined space tends to make the state of soldered connection unstable, resulting in soldered joints lacking in resistance to vibration or impact during service and lowered reliability in electrical connection.

To overcome these problems, the Applicant already proposed a miniature motor having such a construction that electronic components are interposed in series across a pair of input terminals via a spring member made of an electrically conductive material (Japanese Utility Model Application No. Hei-3 (1991)-25151). This improvement invention has made it possible to easily and positively assemble capacitors and other electronic components into a case cover, and realized reduced cost due to easy assembly operation.

Even this improvement invention, however, has certain problems. That is, because of its construction that two capacitors are simultaneously held by a spring member, the improvement invention has a problem that when only one capacitor is needed, the balance of the spring member is deteriorated, leading to failure of stable electrical contact. In the construction where a means of grounding one of the input terminals to the case 31 is used in conjunction with the capacitors, the ground terminal 42 has to be mounted outside the miniature motor, as shown in FIG. 2, thus posing the aforementioned space problem.

SUMMARY OF THE INVENTION

This invention is intended to solve the problems inherent in the prior art and some inconveniences inherent in the aforementioned improvement invention. It is an object of this invention to provide a miniature motor which can use a plurality of electrical-noise reducing means simultaneously, and has high reliability in electrical connection.

DETAILED DESCRIPTION OF THE EMBODIMENTS

Figure 1:
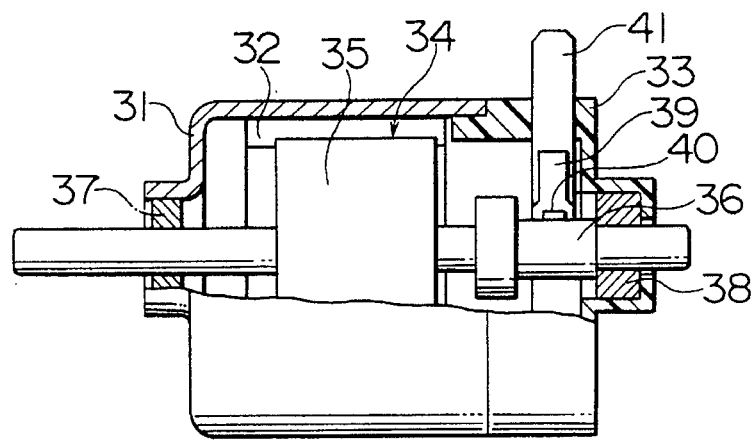
FIG. 1 is a partially cross-sectional side view illustrating an example of a miniature motor to which this invention is applied.
Figure 2:
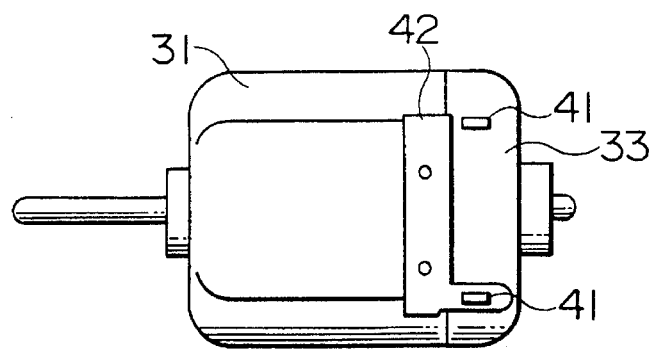
FIGS. 2 and 3 are plan views illustrating examples of electrical-noise reducing means in conventional types of miniature motors.
Figure 3:
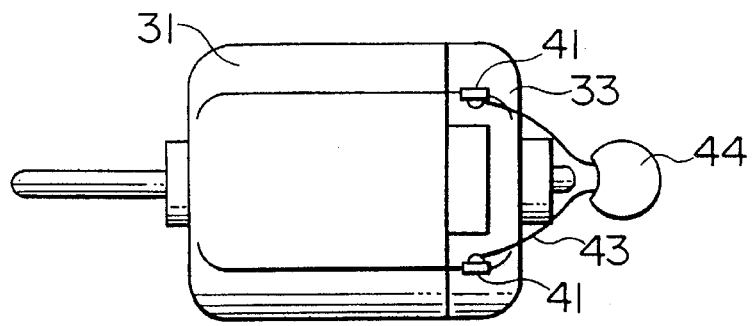
Figure 4:
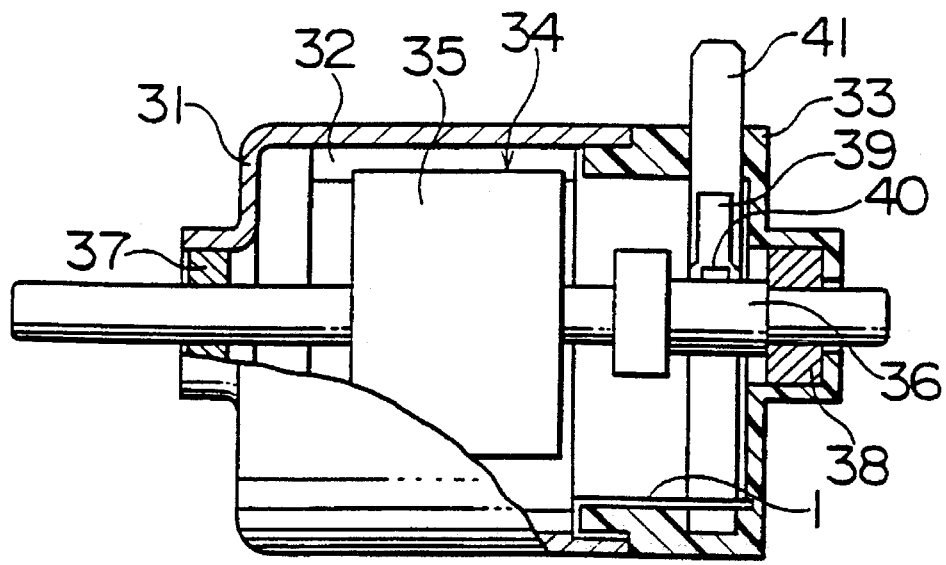
FIG. 4 is a partially cross-sectional side view illustrating an embodiment of this invention.

FIG. 4 is a partially cross-sectional side view illustrating an embodiment of this invention. Like parts are indicated by like reference numerals used in FIG. 1. In FIG. 4, numeral 1 refers to a ground terminal made of an electrically conductive material, such as copper or copper alloy, and formed into such a shape as will be described later, and provided on a case cover 33 made of a thermoplastic resin material and formed into a substantially cup shape. The ground terminal 1 being disposed in such a manner that part of the ground terminal 1 is exposed to the outer circumferential surface of the case cover 33 so that the ground terminal 1 can be electrically connected to the case 31.

Figure 5:
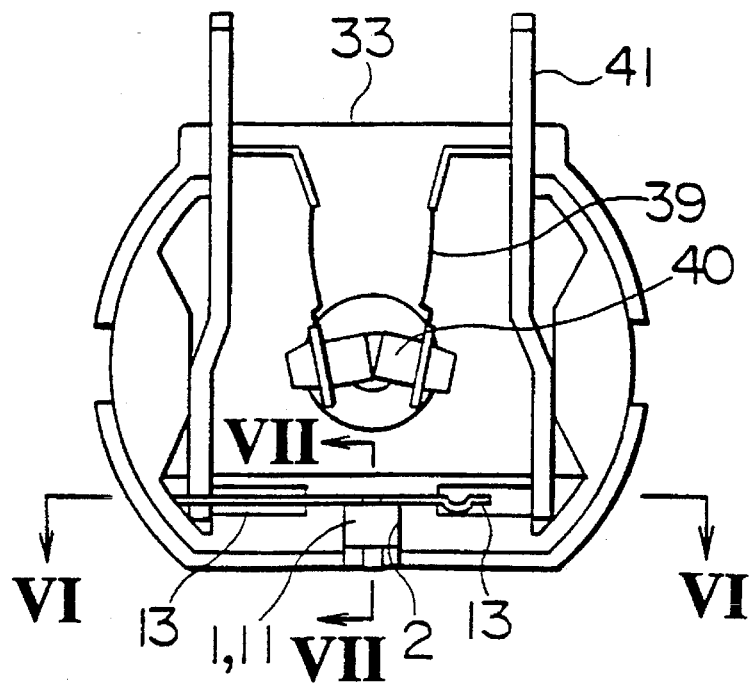
FIG. 5 is an inside end view illustrating the case cover 33 in FIG. 4.
Figure 6:
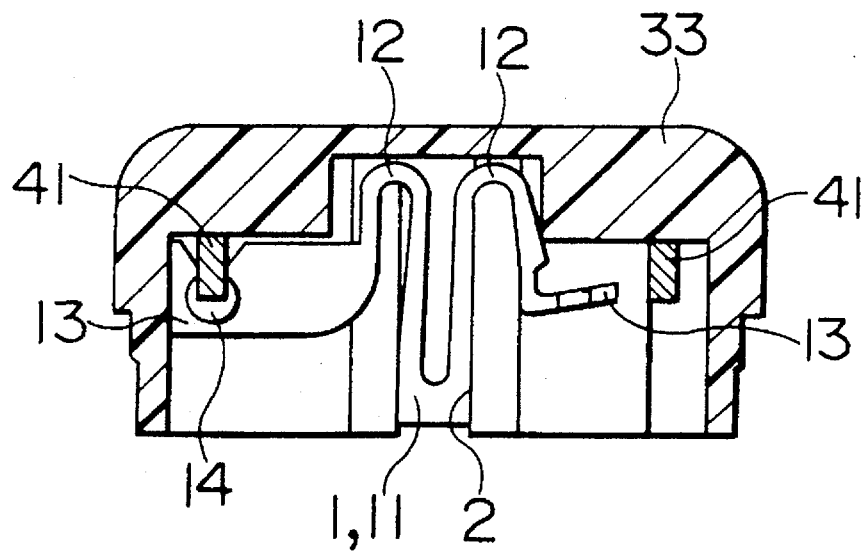
FIGS. 6 and 7 are cross-sectional views taken along lines VI—VI and VII—VII, respectively, in FIG. 5.
Figure 7:
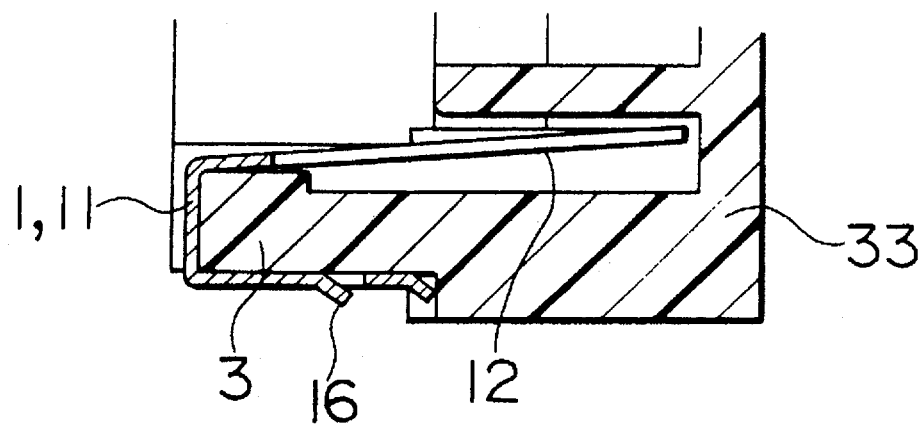

FIG. 5 is an inside end view illustrating the case cover 33 in FIG. 4, and FIGS. 6 and 7 are cross-sectional views taken along lines VI—VI and VII—VII, respectively, in FIG. 5. In FIGS. 5 through 7, the ground terminal 1 is made of an electrically conductive strip or hoop material, comprised integrally of an engaging part 11 formed into a substantially U shape at the middle thereof. A spring part 12 is formed by extending and bifurcating an end of the engaging part 11 into a substantially W shape in planar projected profile; pitching parts 13 are formed at free ends of the spring part 12.

The engaging part 11 and the spring part 12 are formed in an elastically deformable manner. Provided on the case cover is a groove 2 formed into substantially the same width as the width of the engaging part 11 of the ground terminal 1, and an engaging projection 3 with which the engaging part 11 is engaged.

With the aforementioned construction, as the engaging part 11 of the ground terminal 1 is engaged with the engaging projection 3 on the case cover 33 and press-fitted along the groove 2, a key hole-shaped groove 14 provided on one of the pinching part 13 comes in contact with one of the input terminals 41, and the spring part 12 is elastically deformed, and thus the ground terminal 1 is forced all the way to the extreme end of the case cover 33. In this state, even if the spring part 12 is elastically deformed, the side edges of the engaging part 11 is held in position by the groove 2. Thus, the ground terminal 1 is prevented from becoming unstable, and can perfectly maintain the state of contact with the input terminal 41 even if any one of the input terminal 41 is pressed, causing an unbalanced load.

Electrical connection can be positively maintained by fitting the case cover 33 to the case 31, as shown in FIG. 4, to bring the engaging part 11 into to contact with the case 31 after the ground terminal 1 has been press-fitted to the case cover 33. In this case, it is desirable to provide a projection 16 on the contact surface of the engaging part 11 with the case 31 by a lancing and raising means, as shown in FIG. 7, to make electrical connection between the ground terminal 1 and the case 31 more positive.

Figure 8:
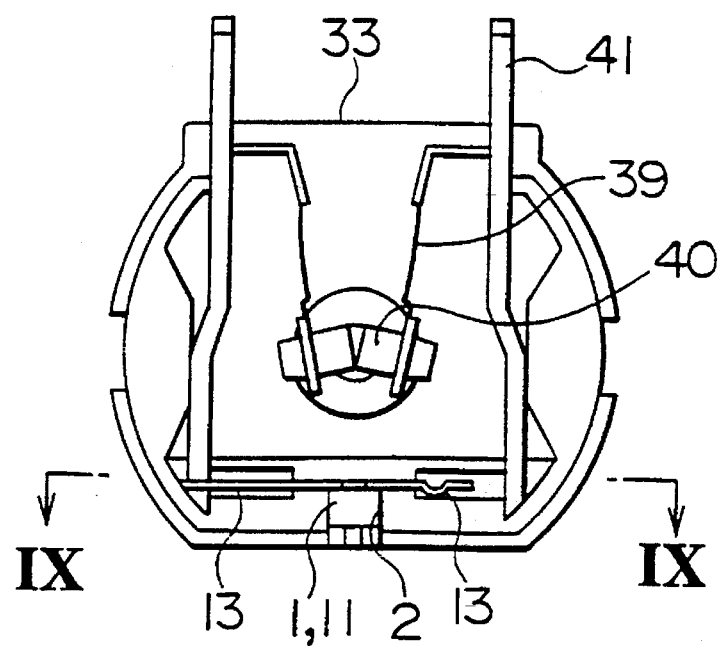
FIG. 8 is an inside end view illustrating the case cover 33 in another embodiment of this invention.
Figure 9:
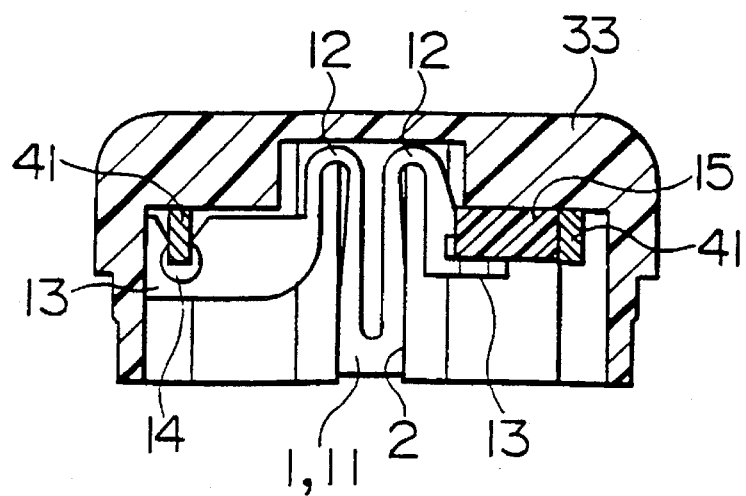
FIG. 9 is a cross-sectional view taken along line IX—IX in FIG. 8.

FIG. 8 is an inside end view illustrating a case cover in another embodiment of this invention, FIG. 9 is a cross-sectional view taken along line IX—IX in FIG. 8. Like parts are indicated by like numerals used in FIGS. 5 and 6. In FIGS. 8 and 9, numeral 15 refers to a capacitor made of laminated ceramic materials constructed in a chip form. That is, one input terminal 41 is pressed and held in position by the pinching part 13 of the ground terminal 1, while the capacitor 15 is pressed onto the other input terminal 41 and held in position by the other pinching part 13 of the ground terminal 1.

In this case, the capacitor 15 is positively held in position between the pinching part 13 and the input terminal 41, and thereby electrical connection is maintained because pushing forces in the axial direction of the case cover 33 and in the direction normal to the axial line are exerted to the capacitor 15 by the resiliency of the spring part 12 of the ground terminal 1. With the aforementioned construction, motor performance can be improved because two types of electrical-noise reducing measures are effected; i.e., one input terminal 41 of the miniature motor being connected to the ground, and the capacitor 15 being connected across the input terminals 41.

This invention having the aforementioned construction and operation can realize the following effects.

(1) Two types of electrical-noise reducing measures can be implemented with a simple construction of press-fitting the ground terminal to the case cover.

(2) When implementing the aforementioned two types of electrical-noise reducing measures, common component members and jigs and tools can be used. This helps improve production efficiency and reduce manufacturing cost.

(3) In the mass-production setup, miniature motors of three specifications; namely, those having no ground terminal, those having one input terminal grounded by a ground terminal, and those having one input terminal grounded by a ground terminal and a capacitor interposed across input terminals, can be manufactured without major changes in the production line.

What is claimed is:

1. A miniature motor comprising:

a case, said case defining an opening;

a rotor rotatably positioned in said case;

a case cover engaging with said case opening, said case cover including first and second input terminals, said case cover also including an engaging projection and said case cover defining a groove;

a ground terminal positioned on said case cover, said ground terminal having a central part formed in a U-shape, and said engaging projection of said case cover engaging with an inside of said U-shape, a portion of said central part of said ground terminal being press fitted into said groove, a width of said groove being substantially similar to a width of said portion of said central part, said ground terminal also including first and second pinching parts, said first pinching part being positioned to connect to said first terminal, said second pinching part being spaced from said second terminal, said first pinching part having a keyhole shaped groove, said first pinching part being positioned to directly contact said first terminal both electrically and physically at said keyhole shaped groove;

said case is electrically connected to said first terminal through said ground terminal.

2. A motor in accordance with claim 1, wherein:

said rotor includes an armature and a commutator;

said case is formed into a bottomed hollow tubular shape and includes a case bearing means for rotatably supporting an end of said rotor, said case also including a permanent magnet positioned on an inside of said case and adjacent said armature;

said case cover has cover bearing means for rotatably supporting another end of said rotor, said case cover including first and second brush means for making sliding contact with said commutator, said first and second input terminals being electrically connected to said first and second brush means respectively.

3. A motor in accordance with claim 1, further comprising:

a capacitor positioned between said second pinching part and said second terminal, said second pinching part including means for pressing against said capacitor to secure said capacitor to said case and make electrical contact, said means also pressing said capacitor against said second terminal to make electrical contact.

4. A motor in accordance with claim 1, wherein:

a leg of said central part of said ground terminal is positioned between, and held by, said case and said case cover, said leg including an integrally formed projection.

5. A motor in accordance with claim 1, wherein:

said first and second pinching parts are positioned on substantially opposite sides of said central part.

6. A motor in accordance with claim 1, wherein:

a leg of said central part of said ground terminal is positioned between, and held by, said case and said case cover, said leg being electrically connected to said case.

7. A motor in accordance with claim 1, further comprising:

an electrical component positioned between said second pinching part and said second terminal, said second pinching part including means for pressing against said electrical component to secure said electrical component to said case to said case and make electrical contact, said means also pressing said electrical component against said second terminal to make electrical contact.

8. A miniature motor comprising:

a case, said case defining an opening;

a rotor rotatably positioned in said case;

a case cover engaging with said case opening, said case cover including first and second input terminals, said case cover also including an engaging projection and said case cover defining a groove;

a ground terminal positioned on said case cover, said ground terminal having a central part formed in a U-shape, and said central part engaging with said engaging projection and said groove of said case cover, a portion of said central part of said ground terminal being secured into said groove, said ground terminal also including a pinching part and a spring part, said spring part having one end laterally fixed to said case cover by said central part being engaged in said groove, said spring part having another end biasing said pinching part against said first terminal.

9. A motor in accordance with claim 8, wherein:

a portion of said central part of said ground terminal is press fitted into said groove, a width of said groove being substantially similar to a width of said portion of said central part.

10. A motor in accordance with claim 8, wherein:

said first pinching part is positioned to directly contact said first terminal both electrically and physically.

11. A motor in accordance with claim 8, wherein:

said ground terminal includes another pinching part and another spring part, said another spring part being having one end laterally fixed to said case cover by said central part being engaged in said groove, said spring part having another end capable of biasing said another pinching part against a component and biasing the component against the second terminal.

12. A motor in accordance with claim 11, wherein:

said groove is positioned on a inside of said case cover;

said central part, said groove, said spring part and said pinching part have a shape and position which does not substantially alter biasing of said pinching part dependent on a presence or absence of the component against said another pinching part.

* * * * *